United States Patent [19]

Penniman et al.

[11] Patent Number: 5,568,360
[45] Date of Patent: Oct. 22, 1996

[54] HEAT PIPE DEVICE AND METHOD FOR ATTACHING SAME TO A COMPUTER KEYBOARD

[75] Inventors: Mark B. Penniman, Austin; Carmen M. Schlesener, Pflugerville; Jim J. Kizer, Austin, all of Tex.

[73] Assignee: Dell USA, L.P., Austin, Tex.

[21] Appl. No.: 412,373

[22] Filed: Mar. 29, 1995

[51] Int. Cl.[6] .............................. H05K 7/20; F28D 15/02
[52] U.S. Cl. ..................... 361/687; 361/700; 174/15.2; 165/104.33
[58] Field of Search .................................... 361/680, 687, 361/699, 700; 174/15.2; 165/104.26, 104.33; 257/715, 718, 719

[56] References Cited

U.S. PATENT DOCUMENTS 5,402,311   3/1995   Nakajima ................................ 361/687

OTHER PUBLICATIONS

IBM Technical Disclosure Bulletin, CPU Cooling System for Notebook PC, vol. 37 No. 11.

*Primary Examiner*—Leo P. Picard
*Assistant Examiner*—Jayprakash N. Gandhi
*Attorney, Agent, or Firm*—Henry N. Garrana; Mark P. Kahler; Michelle M. Turner

[57] ABSTRACT

A heat transfer system is provided for dissipating thermal energy within the personal computer. The transfer system is designed to move heat from a heat source, such as a central processing unit (CPU), to a heatsink arranged upon the portable computer keyboard. The heat transfer mechanism includes a heat slug thermally coupled to the CPU heat source and a heat pipe thermally coupled to a backside surface of a computer keyboard. The heat pipe is designed having minimal thermal gradient, and includes an evaporation/condensation cycle associated with its operation. The heat pipe is preferably orthogonally shaped having at least one flat surface arranged near the intersection of the orthogonal members. The flat section is in registry with a heat source. Movement of the flat section relative to the heat source effectuates abutment and thermal contact therebetween. The present thermal energy transfer system is designed for enhanced heat transfer within a portable computer system without undergoing the disadvantages of bulky finned heatsinks and/or fans.

20 Claims, 3 Drawing Sheets

HEAT PIPE DEVICE AND METHOD FOR ATTACHING SAME TO A COMPUTER KEYBOARD

BACKGROUND OF THE INVENTION

1. Field of the Invention

This invention relates to a personal computer and more particularly to a heat exchange device and system coupled to a computer keyboard for dissipating thermal energy within the personal computer.

2. Background of the Relevant Art

A computer system is one which, at a minimum, includes an input/output (I/O) port, a central processing unit (CPU), a read only memory (ROM), a random access memory (RAM), an address bus, a control bus, and a data bus. Depending upon its complexity, a computer system can be classified as a mainframe, a minicomputer or a microcomputer. Mainframe computers, often termed supercomputers, have in many instances today been replaced by smaller, less costly minicomputers. The term minicomputer is therefore used to denote a general purpose personal computer used for computation, process control, word processing, etc. Many workstation minicomputers use graphic-intensive programs and are therefore used for more specialized functions such as computer-aided design (CAD) and computer-aided engineering (CAE). A minicomputer typically employs a motherboard having separate I/O control, CPU, ROM and RAM2 integrated circuits arranged upon the motherboard. A microcomputer, on the other hand, generally incorporates I/O control, CPU, ROM and RAM functions on a single monolithic silicon substrate. Depending upon its application, a single chip microcomputer is often denoted as a microcontroller (MCU).

Regardless of the type of computer system used, the CPU often generates large amounts of thermal energy (or heat) during its operation. Advances in CPU speed and bus throughput have further compounded this problem. Large mainframe computers are usually cooled by forcing cool air or liquid coolant over the CPU heat source. A microcomputer, on the other hand, is generally designed to operate at lower voltages and/or speed, thereby avoiding higher temperature operation. Constrained to application performance demands, a minicomputer, however, must operate at a higher speeds and voltages than a microcomputer. Yet, a minicomputer is not afforded the high costs necessary to cool supercomputing mainframes.

Most minicomputers of the desktop variety are thermally managed by forcing air across the motherboard and particularly across the CPU. Forcing air in such a manner requires a fan placed upon the minicomputer chassis and, in some instances, an additional fan placed directly above the CPU. In lieu of or in addition to a fan, many minicomputer manufacturers often employ a heatsink. A heatsink is generally made of metal having opposed surfaces, wherein one surface is mostly flat while the other surface includes a plurality of outward-extending fins. The flat surface is thermally bonded to the encapsulated CPU, allowing the fins to project into the airplow stream carried through the minicomputer chassis. A silicon compound is normally used as the thermal bonding agent. The metal fins function similar to a metal radiator in that they remove heat from the thermally bonded, underlying CPU by means of conduction, convection and radiation.

Fans and heatsinks provide a cost effective mechanism for thermally managing many types of minicomputer systems. Fans, however, require power and heatsinks require space. While power and space are generally in abundant supply in desktop-type minicomputers, portable minicomputers (often termed "laptop computers") have only a limited supply of both power and space. A commercial advantage is achieved by manufacturing portable computer that are both small and lightweight. Further, portable computers must operate with power conservation in mind. An operable fan would unduly draw upon the batteries of a laptop making it unattractive for long periods of battery-operated use.

A need therefore exists for a thermal management system within a portable computer which is both cost effective and operably superior to conventional fans and finned heatsinks. Thermal management of portable computers has become an even more important consideration with the advent of higher speed CPUs, or CPUs having advanced 32-bit and 64-bit bus structures. As an example, Pentium®-based CPUs generate considerably more thermal energy than predecessor x386 and x486 CPUs. In order to effectively use a Pentium®-based CPU within a portable computer, it becomes necessary that heat be efficiently drawn away from the CPU absent the use of bulky finned heatsinks and power consumptive fans.

SUMMARY OF THE INVENTION

The problems outlined above are in large part solved by the thermal management system of the present invention. That is, the thermal management system hereof is believed to be a technological advance over conventional finned heatsinks and/or fans, and provides a cost-effective solution for thermal dissipation within a portable computer. The present thermal management system takes advantage of one of the largest heatsink structure found on all portable computers. The present invention utilizes at least a substantial portion if not the entire computer keyboard as the heatsink structure.

A portable computer keyboard comprises two opposing, substantially planar surfaces. One surface includes a plurality of keys upon which a user can strike to input data into the minicomputer. The other surface is generally rigid to withstand user pressure upon the keyboard keys. The surface not having keys is made of a rigid, somewhat thin layer of material designed to withstand forces associated with key manipulation. This layer is not only rigidly designed, but purposefully consists of a thermally conductive material, a suitable material being aluminum.

The backside surface of the keyboard includes two or more holes formed through the rigid layer. The holes serve to receive a coupling of a heat exchange device, also referred to as a "heat pipe". The heat pipe has a substantially flat surface which is thermally coupled through a compliant, thermally conductive member to the backside surface of the keyboard. The holes are tooled to receive screws placed through apertures within the heat pipe and into corresponding holes. Compliant eyelets are placed within the holes using a press-fit insertion force. Each eyelet preferably includes threads on its inner diameter surface configured to rotatably receive and mate with the outer diameter threads of a corresponding screw. The eyelets therefore aid in screw insertion and help retain a somewhat even securement force distribution across the heat pipe and, specifically, a more even securement force across the heat pipe-keyboard juncture.

Accordingly, the keyboard serves as a heatsink, and a heat pipe mounted thereon serves to transfer thermal energy from a heat source (i.e. CPU) to the keyboard heatsink. Importantly, the keyboard heatsink is configured as one of the largest metallic member within a portable computer and is therefore optimally chosen as the heatsink of the present design.

The heat pipe not only includes a flat surface which bears against the heatsink computer keyboard backside surface, but also includes a flat surface which bears against a flat heat source (i.e., bears directly or indirectly, via a heat slug, against the CPU). Screws are advantageously used to removably secure the heat pipe to the keyboard heatsink. The heat pipe is made of a rigid metallic material (preferably copper) which, when coupled to the keyboard, adds to keyboard rigidity and helps minimize keyboard warpage resulting from, for example, heat upon the keyboard and user pressure against top-side keys. The heat pipe can therefore be removed from the keyboard to allow a defective keyboard to be discarded without sacrificing the heat pipe, or vice versa.

Broadly speaking, the present invention contemplates a heat exchange device. The heat exchange device includes a metal vessel of high thermal conductivity sealed about a heat exchange fluid. The vessel is vacuum sealed and includes opposing ends with a substantially flat surface extending between the opposing ends. A flange is designed to extend from each of the opposing ends, and includes an aperture extending through the flange. The substantially flat surface of the heat exchange device is used to thermally couple to a substantially flat thermal source, and is further used to couple to a substantially flat thermal sink. The vessel can therefore be of rectangular cross-section having two or more perpendicularly arranged substantially flat surfaces. One surface can therefore be coupled to a heat source and another surface thermally coupled to a heat sink. At least one of those flat surfaces is preferably arranged at the intersection of two contiguous, orthogonally oriented portions of the vessel. The flat surface can thereby receive a thermal source at the intersection of the two contiguous, orthogonally oriented portions to bring about heat transfer from the intersecting region to both distal ends of an orthogonally shaped vessel.

The present invention further contemplates a system for cooling a portable computer. The system comprises a portable computer having a keyboard coupled upon the computer. The keyboard includes a plurality of keys arranged on one surface of the keyboard and a metal plate arranged on the opposing surface of the keyboard. An orthogonally shaped heat pipe is removably coupled to the metal plate. The heat pipe includes at least one flange. Preferably, the heat pipe includes three flanges spaced from each other and extending from respective side portions of an orthogonally shaped heat pipe. Each flange includes an aperture and is adapted to receive a screw extending through the aperture and into a hole within the metal plate. The flange and associated aperture thereby allow removable attachment and firm, evenly distributed thermal coupling of the entire heat pipe structure to the metal plate.

The present invention still further contemplates a method for attaching a heat pipe to a computer keyboard. The method includes steps of providing holes in a metal plate of a keyboard arranged opposite the keyboard keys. Conformable eyelets having inner diameter threads are then fixedly inserted into the holes. Apertures extending through flange portions at the sides of a heat pipe are then aligned with the eyelets. Screws are thereafter inserted through the apertures and into the eyelet-covered holes.

BRIEF DESCRIPTION OF THE DRAWINGS

Other objects and advantages of the invention will become apparent upon reading the following detailed description and upon reference to the accompanying drawings in which.

Figure 1:
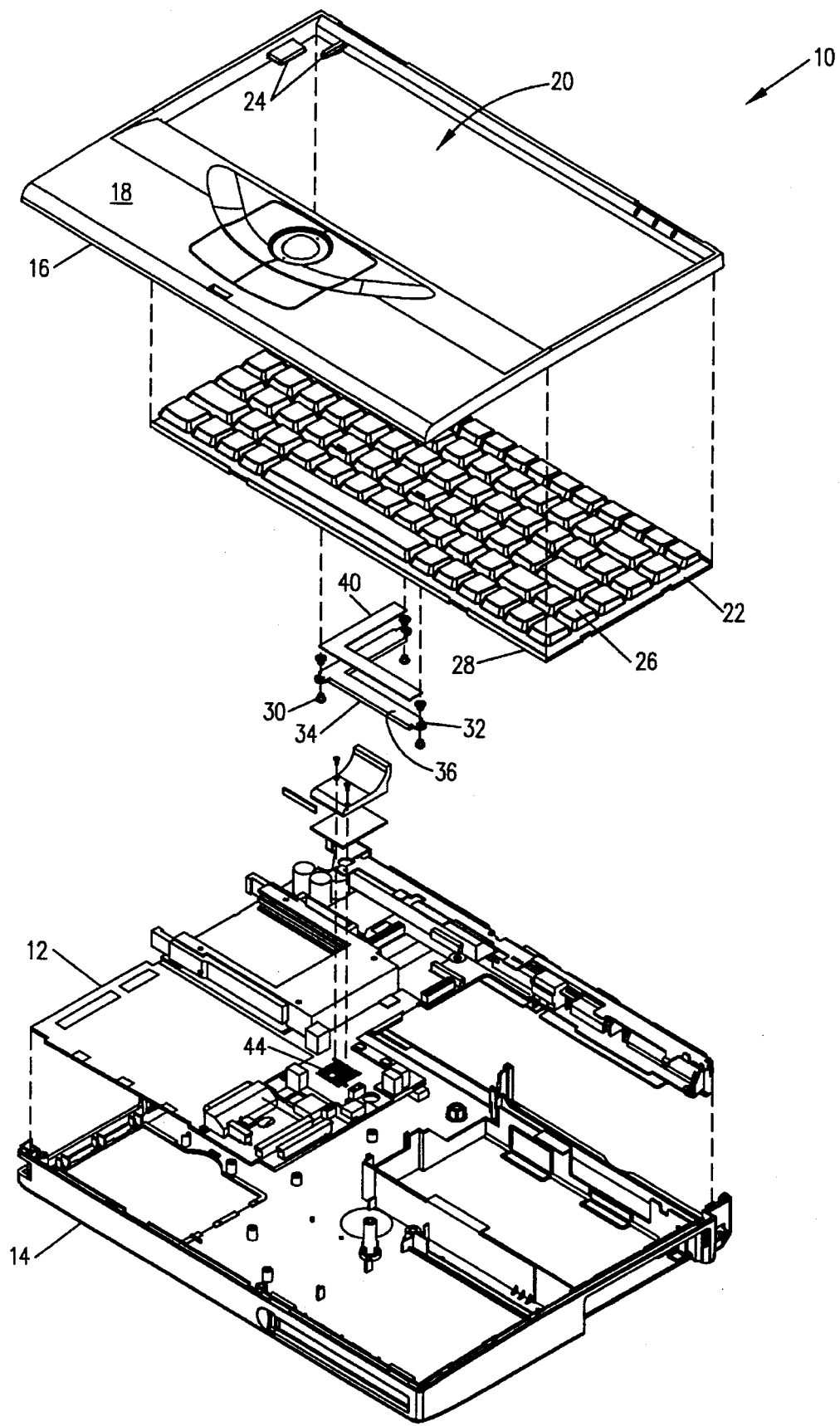
FIG. 1 is an exploded, top-side isometric view of a portable computer having incorporated therein a heat exchange system of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 illustrates an exploded, top-side isometric view of a portable computer 10. Portable computer 10 is herein defined as a minicomputer-type digital computer having numerous integrated circuits arranged upon a printed circuit board or motherboard. Motherboard ("board" 12) is also used to structurally house hard drives, floppy drives, and various other peripheral units normally associated with an AT-compatible minicomputer System. Board 12 is shown in FIG. 1 having receptors which couple onto mating receptors arranged upon or within a portable computer base 14.

Configurations of base 14 as well as board 12 are dependent upon the various applications and capabilities of the computing device. Generally speaking, board 12 includes any single, double, or multi-layered board having printed conductors placed upon or within the board material. Board 12 is designed to receive and electrically interconnect, through the printed conductors, separately manufactured electrical Components, including a CPU, RAM, ROM, and I/O controllers Base 14 is made of any rigid material which is easily and cost effectively shaped to receive board 12. Base 14 includes a lower surface designed to reside upon a working surface, such as a desk or a user's lap. The upper portion of base 14 is designed not only to receive board 12, but also to receive a palm rest housing 16. Base 14, board 12 and palm rest housing 16 are shown in FIG. 1 as having various mechanical structures which depict how they might be interconnected as a single portable computer unit. For sake of clarity and brevity, various coupling structures and subcomponents shown in FIG. 1 and throughout the drawings which do not impart understanding to the present invention are not denoted with reference numerals. However, it is understood by a skilled artisan how those structures would appear and function to not only provide assembly of a portable computer but allow coupling of peripheral devices within that portable computer.

Palm rest housing 16 comprises an upper surface 18 upon which a user's palms can rest while entering data. Configured within palm rest housing 16 is an opening 20 into which a computer keyboard 22 can be placed. Keyboard 22 is inserted, during assembly, within opening 20 and secured within the perimeter of the palm rest opening 20. The upper surface of keyboard includes a plurality of keys 26 which allow strike entry of numerical codes, numbers, plain text or a combination of the above. On a surface of keyboard 22 opposing keys 26 is a metallic, substantially planar member 28. Member 28 (clearly shown in FIGS. 2–3) includes two or more holes formed by a tooling mechanism within the member. Each hole (shown in FIG. 2 as reference numeral 29) is configured to receive an eyelet 31, wherein the hole and eyelet are dimensioned to thereafter receive a screw 30 rotatably inserted through an aperture 32 of a heat exchange device (or heat pipe) 34.

Heat pipe 34 is designed having a substantially planar surface 36 which, when coupled via screws 30, provides maximum surface area between heat pipe 34 and heat sink surface 28. Surface 36 thereby maximizes heat transfer between heat pipe 34 and surface 28. Instead of being circular in cross-section, heat pipe 34 is designed having a cross-section that is either semi-circular, arcuate bound by two perpendicular flat surfaces or, preferably, rectangular. To enhance thermal conductivity between surface 36 and surface 28, a thermally conductive, pliant member 40 is coupled the between. Member 40 can be made of any thermally conductive material, a suitable material being Thermagon T-Pli 220 material obtainable from Thermacore, Inc. of Lancaster, Pa.

Heat pipe 34 generally comprises a thermally conductive metallic vessel (i.e., copper vessel) sealed about a heat exchange fluid. The vessel draws vaporized fluid away from the heat input point to a heat exchange area within the vessel. A wick structure returns the condensed fluid from the heat exchange area to the heat input point, thus expelling a latent heat of vaporization in the process. The heat exchange process (vaporization/condensation) is facilitated by the vacuum seal obtained by the vessel. The wick structure comprises any porous member, and the working fluid includes any fluid having latent heat of vaporization, a suitable fluid for the present application includes water.

Figure 2:
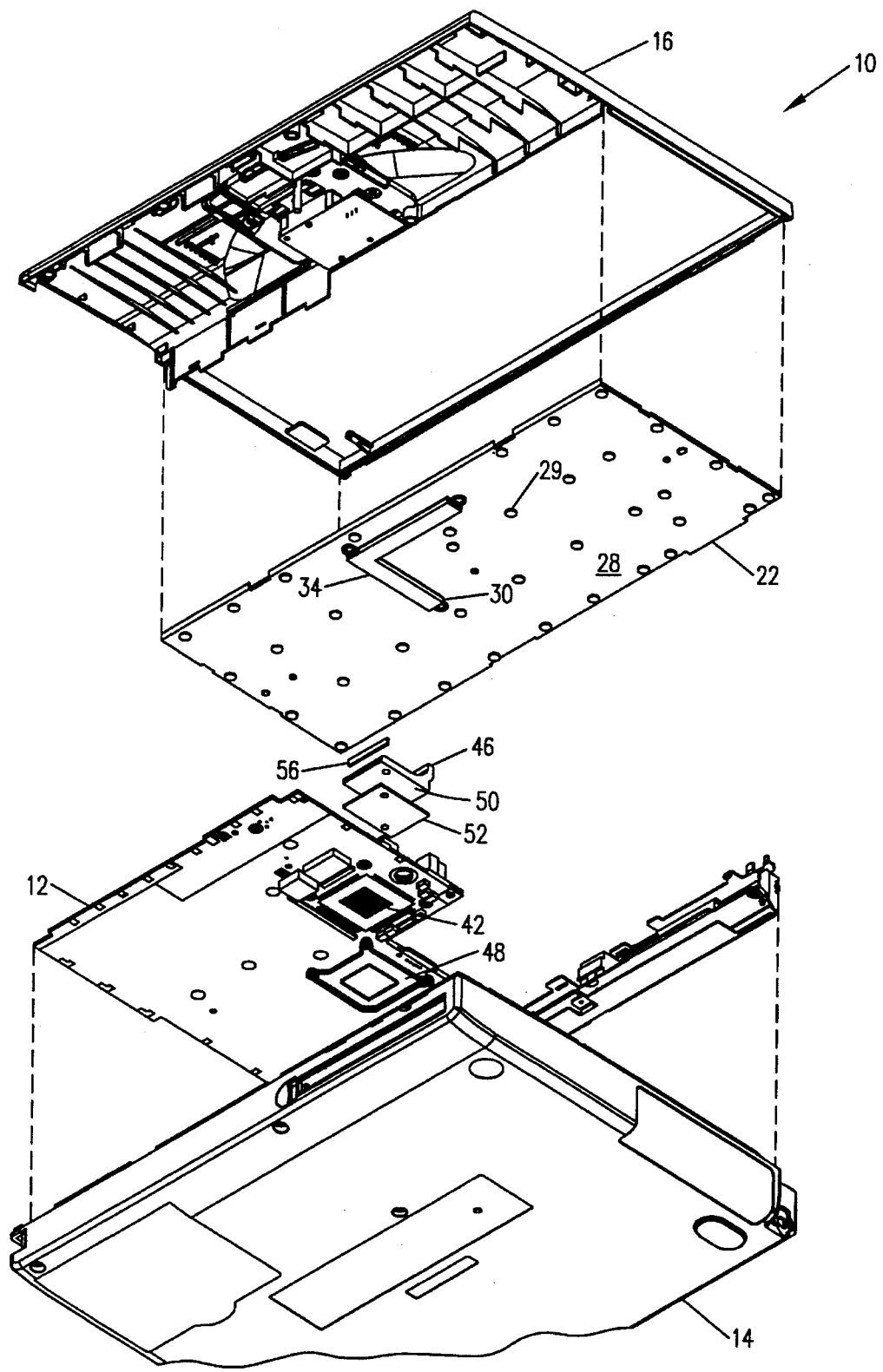
FIG. 2 is an exploded, bottom-side isometric view of a portable computer having incorporated therein a heat exchange system of the present invention.

Heat pipe 34 is used to draw heat from a heat source thermally coupled to an outer surface of the heat pipe vessel to a heatsink also thermally coupled to the heat pipe a spaced distance from the heat source. FIGS. 1 and 2 in combination, illustrate the heat source originating as a CPU integrated circuit 42 thermally connected to a field of vias 44 which extend through board 12 to a thermally coupled heat slug 46. A lead guard 48 is shown in FIG. 2 dimensioned to cover CPU 42 mounted on the bottom-side surface of board 12. CPU 42 is mounted in accordance with well-known surface mount techniques, and is thereby preferably housed within a tape carrier package. Each via of the field of vias 44 is formed according to a plated-through hole (PTH) technique having a thermally conductive material extending along the plated holes formed entirely through board 12. The plated material is a thermally conductive material, a suitable material being, for example, electroplated copper, aluminum or solder. Vias 44 thereby function to draw thermal energy away from CPU 42, through board 12 and onto heat slug 46.

Heat slug 46 is made from a thermally conductive material such as aluminum. Heat slug 46 includes a substantially flat surface 50 which is coupled in thermal contact with a compliant, thermally conductive material 52 made preferably from the same material used in forming material 40. Slug 46 is coupled, with intermediate material 52, to board 12 using screws 54. Once coupled, a thermal path is formed between CPU 42 and slug 46 with minimum thermal gradient formed along that path.

Figure 3:
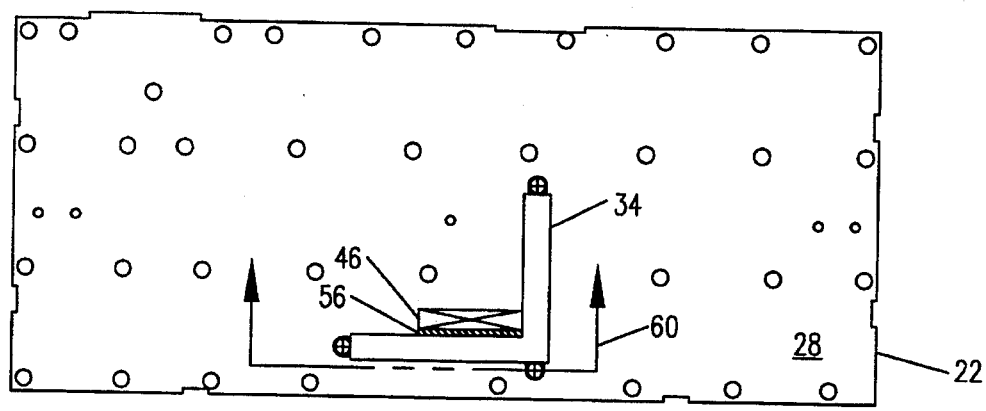
FIG. 3 is a plan view of a bottom-side heatsink surface of a portable Computer keyboard having a heat exchange device mounted to the heatsink surface according to the present invention.

An upper portion of heat slug 46 is designed to receive a compliant, thermally conductive member 56. Member 56 is made of the same material used in forming member 40 and member 52. Member 56 is removeably secured between the upper portion of slug 46 and a side surface of heat pipe 34 during times in which portable computer 10 is assembled. Advantageously, heat slug 46 is thermally coupled through abutment between a substantially flat side surface of heat pipe 34 and a substantially flat side surface arranged near the middle of heat pipe 34. If heat pipe 34 is configured having two orthogonally placed members adjoined at an intersecting point, the heat drawn from heat slug 46 is placed upon the heat pipe adjacent the intersecting point. Placement near the intersecting point ensures a dual evaporation/condensation cycle from the heat source location to cooler locations at both distal regions of the orthogonally shaped heat pipe. FIG. 3 provides illustrative detail of the heat plug placement and dual circulation benefits derived therefrom.

Turning now to FIG. 3, heat pipe 34 is shown coupled to the keyboard heatsink member surface 28. When assembled, board 22 is drawn in the direction shown by arrows 60. When so moved, heat pipe 34 is firmly drawn with keyboard 22 against member 56 of heat slug 46, wherein member 56 and heat slug 46 are fixed upon board 12. It is thereby understood that keyboard 22 and attached heat pipe 34 move laterally during assembly and thereby thermally couple through lateral abutment to a stationary heat slug 46 fixed upon base member 14.

Figure 4:
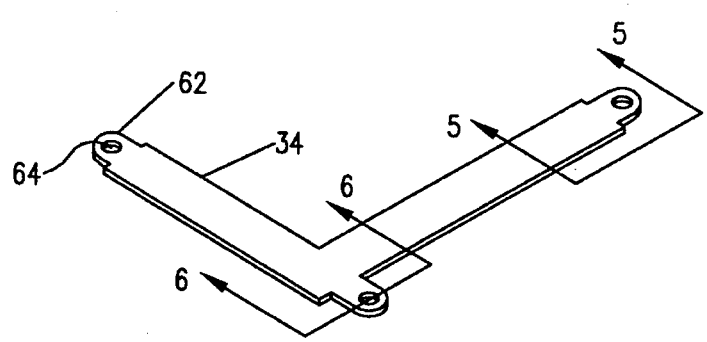
FIG. 4 is an isometric view of the present heat exchange ("heat pipe") device.

Turning now to FIG. 4, an isometric view of heat pipe 34 is shown. Heat pipe 34 can be of any configuration, including a single elongated member or the more preferred orthogonally arranged, contiguous dual members. Orthogonally arranged dual members not only provide dual circulation therein, but also add more rigidity and structural support to the attached keyboard. Any configuration can be used, provided the heat pipe cross-section has at least one substantially flat surface. Preferably the cross-section includes two flat surfaces, one surface for thermal abutment to the heat source and the other surface for thermal coupling to the heatsink. A preferred cross-section thereby includes a rectangular cross-section shown in FIG. 4.

Extending from side regions of heat pipe 34 are at least two flanges 62. Shown in FIG. 4 are three flanges 62 in the illustrated design. Each flange 62 includes an aperture 64 extending entirely through the flange. Each aperture 64, and associated heat pipe 34 is configured such that respective apertures 64 align with holes 29 formed within keyboard heatsink 28. Further details pertaining to various attachment devices are shown in reference to FIGS. 5 and 6.

Figure 5:
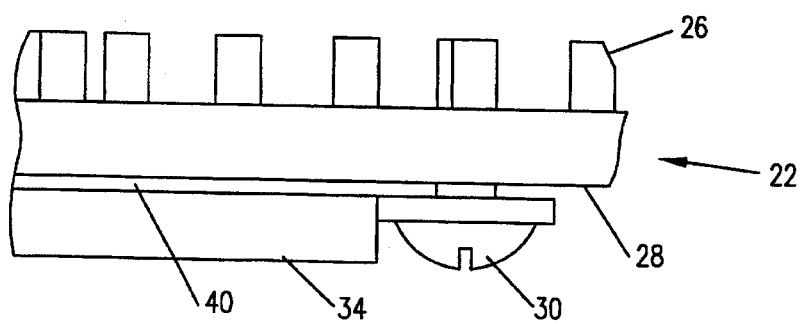
FIG. 5 is a side elevation view of the present heat pipe coupled onto the keyboard heatsink surface shown along plane 5—5 of FIG. 4.
Figure 6:
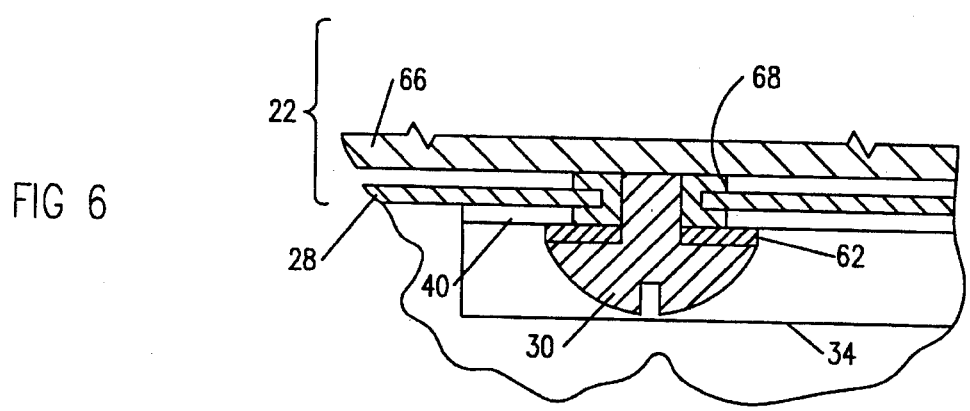
FIG. 6 is a cross-sectional view of the present heat pipe coupled onto the keyboard heatsink surface shown along plane 6—6 of FIG. 4.

Turning now to FIG. 5, a side view of heat pipe 34 coupled onto planar keyboard member 28 is illustrated along plane 5—5 of FIG. 4. Specifically, FIG. 5 illustrates an end portion of heat pipe 34 thermally coupled to heatsink surface 28 of keyboard 22. FIG. 6 illustrates cross-sectional detail of the coupling mechanism along plane 6—6 of FIG. 4. FIG. 6 provides a cross-section of a partial keyboard 22 and, more specifically, a portion of planar member 28. Planar member 28 is part of computer keyboard 22, but resides a spaced distance from the upper portion 66 of keyboard 22. Threaded eyelets 68 are press-fit through holes formed within member 28.

It will be appreciated to those skilled in the art having the benefit of this disclosure that this invention is capable of applications with portable computers, and specifically computers with advanced CPUs which operate at high processing speed, at high voltage levels and using enhanced 32-bit or higher bus structures. Furthermore, it is to be understood that the form of the invention shown and described is to be taken as various exemplary preferred embodiments. Modifications and changes may be made without departing from the spirit and scope of the invention as set forth in the claims. It is intended that the following claims be interpreted to embrace all such modifications and changes and, accordingly, the specification and drawings are to be regarded in an illustrative means rather than a restrictive sense.

What is claimed is:

1. A heat exchange device, comprising:

a vessel sealed about a heat exchange fluid, said vessel having opposing ends and a substantially flat surface extending between said opposing ends; and a flange extending from each of said opposing ends and having an aperture extending therethrough.

2. The heat exchange device as recited in claim 1, wherein said fluid-contained vessel comprises a heat pipe.

3. The heat exchange device as recited in claim 1, wherein said vessel is of rectangular cross-section.

4. The heat exchange device as recited in claim 1, wherein said flat surface is adapted to receive in thermal communication a substantially flat surface of a thermal source.

5. The heat exchange device as recited in claim 1, wherein said vessel is arranged in two contiguous, orthogonally oriented portions.

6. The heat exchange device as recited in claim 5, wherein the intersection of said orthogonally oriented portions comprises a central flange extending therefrom and a central aperture arranged through said central flange.

7. The heat exchange device as recited in claim 5, wherein a surface of said vessel adjacent said intersection comprises said substantially flat surface.

8. The heat exchange device as recited in claim 7, wherein said vessel, during operation, transfers heat from said substantially flat surface to both said opposing ends.

9. The heat exchange device as recited in claim 1, further comprising a radially conformable eyelet press-fit within a hole formed through a layer of thermally conductive material coupled onto a surface of a computer keyboard.

10. The heat exchange device as recited in claim 9, wherein said eyelet includes a threaded inner diameter surface for receiving a screw placed through said aperture and into said computer keyboard.

11. A system for cooling a portable computer, comprising:

a portable computer having a keyboard coupled upon said computer, said keyboard includes a plurality of keys arranged on one surface of said keyboard and a metal plate arranged on the opposing surface of said keyboard; and a heat pipe having a substantially flat outer surface which is adapted for removable, thermal coupling to said metal plate.

12. The system as recited in claim 11, wherein said heat pipe comprises a vessel sealed about a heat exchange fluid.

13. The system as recited in claim 12, wherein said vessel includes a substantially flat outer surface which abuts in thermal communication with said metal plate.

14. The system as recited in claim 12, wherein said vessel includes two substantially flat outer surfaces, one of which abuts in thermal communication with said metal plate and the other of which abuts against a substantially flat surface of a thermal source.

15. The system as recited in claim 11, wherein said heat pipe comprises three flanges spaced from each other and extending from respective portions of said heat pipe, each flange having an aperture and a screw extending through said aperture and into said metal plate.

16. The system as recited in claim 11, further comprising a compliant, thermally conductive material coupled between said heat pipe and said metal plate.

17. A method for attaching a heat pipe to a computer keyboard, comprising the steps of:

providing holes in a metal surface of a computer keyboard arranged opposite keyboard keys;

fixedly inserting a threaded eyelet into each of said holes;

aligning apertures Which extend from side portions of a heat pipe with said eyelet-inserted holes; and threading screws through each said apertures and into said eyelet-inserted holes.

18. The method as recited in claim 17, further comprising placing a compliant, thermally conductive material between said metal surface and said heat pipe prior to said aligning and threading steps.

19. The method as recited in claim 17, further comprising aligning a substantially flat surface of said heat pipe with a substantially flat thermal source and thereafter abutting said flat surface and thermal source together in thermal communication.

20. The method as recited in claim 19, wherein said heat pipe is orthogonally shaped and said substantially flat surface is configured upon a side of said heat pipe adjacent a merged region of the intersecting portions of said orthogonally shaped heat pipe.

* * * * *